(12) United States Patent
Xiao (10) Patent No.: US 6,662,167 B1
(45) Date of Patent: Dec. 9, 2003

(54) METHOD FOR GENERATING NEAR-OPTIMAL SEQUENCING OF MANUFACTURING TASKS SUBJECT TO USER-GIVEN HARD AND SOFT CONSTRAINTS

(76) Inventor: Jing Xiao, 4716 Heatherton Pl., Charlotte, NC (US) 28270

( * ) Notice: Subject to any disclaimer, the term of this patent is extended or adjusted under 35 U.S.C. 154(b) by 0 days.

(21) Appl. No.: 09/461,962

(22) Filed: Dec. 15, 1999

Related U.S. Application Data (60) Provisional application No. 60/112,329, filed on Dec. 15, 1998.

(51) Int. Cl.[7] .............................. G06N 3/00; G06N 3/12; G06F 15/18
(52) U.S. Cl. ........................ 706/13; 706/12; 706/912
(58) Field of Search ............................ 706/13, 12, 912

(56) References Cited

U.S. PATENT DOCUMENTS

| | | | |
|---|---|---|---|
| 5,319,781 A | 6/1994 | Syswerda | 705/8 |
| 5,467,268 A | 11/1995 | Sisley et al. | 705/9 |
| 5,541,848 A | 7/1996 | McCormack et al. | 700/213 |
| 5,727,130 A | 3/1998 | Hung | 706/13 |
| 5,761,381 A | 6/1998 | Arci et al. | 706/13 |
| 5,764,953 A | 6/1998 | Collins et al. | 703/17 |
| 5,787,283 A | 7/1998 | Chin et al. | 717/101 |
| 5,839,120 A | 11/1998 | Thearling | 706/13 |

OTHER PUBLICATIONS

V. Tam; An efficient Heuristic–Based Evolutionary Algorithm for Solving Constraint Satisfaction Problems; May 21–23, 1998; IEEE: 0–8186–8548–4.*

(List continued on next page.)

Primary Examiner—Wilbert L. Starks, Jr.
Assistant Examiner—Joseph P. Hirl
(74) Attorney, Agent, or Firm—Kilpatrick Stockton LLP (57) ABSTRACT

The present invention provides a method utilizing evolutionary processes for solving partial constraint satisfaction problems in order to produce a near-optimal or optimal sequence of products for manufacture. More specifically, a computer implemented method for generating an optimized sequence of "N" number of products for manufacture is provided, where said products are of "M" number of distinct types with a fixed number ("$N_t$") of each type being desired and each product type comprising an array ("Q") of distinct features, wherein said manufacture is optionally constrained by one or more of the following constraints: the production requirement for each product type, feature-based position equations, and feature-based position inequalities, wherein each of said constraints is individually designated as either a hard constraint which cannot be violated, or as a soft constraint which can be violated at a predetermined cost; said method comprising: generating an initial population of chromosomes, wherein each chromosome represents a feasible sequence of products of various types for manufacture, feasibility depending on satisfaction of all of said hard constraints; associating a fitness value with each chromosome, said fitness value being a function of the predetermined cost associated with the degree of violation of each of said soft constraints; sorting said chromosomes based on the fitness value associated with each chromosome; and applying iteratively to the population of chromosomes a reproductive process, comprising (1) selection of a genetic operator, (2) selection of one or two chromosomes, the number of chromosomes to be selected correlating with the selected genetic operator, (3) application of the selected genetic operator to the selected one or two chromosomes to cause generation of one or two offspring, (4) insertion of one offspring chromosome into the sorted population, and (5) discard of one of the least desirable chromosomes in the population; said iterative process being continuously run until the fitness value for the best chromosome satisfies a known criterion or until a pre-determined time has elapsed.

26 Claims, 5 Drawing Sheets

OTHER PUBLICATIONS

Reeves. Colin R., et al., "Genetic Algorithms, Path Relinking, and the Flowshop Sequencing Problem," *Evolutionary Computation*, vol. 6, No. 1, Spring 1998, pp. 45–60.

Warick, Terry et al., "Tackling Car Sequencing Problems Using a Generic Genetic Algorithm," *Evolutionary Computation*, vol. 3, No. 1, 1996, pp. 267–298.

Back, T., Fogel, D.B. and Michalewicz, Z, eds.,*Handbook of Evolutionary Computation*, New York: Oxford Univ. Press and Institute of Physics, 1997.

Bellman, R.E. and Dreyfus, S.E.,*Applied dynamic programming*, Princeton University Press, 1962.

Burke, Edmund K., et al., "Initialization Strategies and Diversity in Evolutionary Timetabling," *Evolutionary Computation*, vol. 6, No. 1, Spring 1998, pp. 81–103.

Cheng, J., Y. Lu, G. Puskorius, S. Bergeon, and J. Xiao, "Vehicle Sequencing based on Eovlutionary Computation," *Proceedings of 1999 Congress on Evolutionary Computation*, Washington D. C., Jul. 6–9, 1999, pp. 1207–1214, IEEE Press.

Cotta, Carlos et al., "Genetic Forma Recombination in Permutation Flowshop Problems," *Evolutionary Computation*, vol. 6, No. 1, Spring 1998, pp. 25–44.

Deb, Kalyanmoy, "Time Scheduling of Transit Systems With Transfer Consideration Using Genetic Algorithms," *Evolutionary Computation*, vol. 6, No. 1, Spring 1998, pp. 1–24.

Fogel, Lawrence et al., "Artificial Intelligence Through Simulated Evolution," John Wiley & Sons, Inc., 1966.

Garey, M. and Johnson, D. , *Computers and Intractability: a guide to the theory of NP–completeness*, Freeman, 1979.

Hart, Emma et al., "Solving a Real–World Problem Using an Evolving Heuristically Driven Schedule Builder," *Evolutionary Computation*, vol. 6, No. 1, Spring 1998, pp. 61–80.

Holland, John H. *"Adaptation in Natural and Artificial Systems: An Introductory Analysis with Applications to Biology, Control and Artificial Intelligence,"* The University of Michigan Press, 1975.

Lawler, E. L. and Wood, D. E., "Branch and bounds methods: A Survey," *Operations Research*, 14, 699–719, 1986.

Michalewicz, Z. *Genetic algorithms+ data structures=evolution programs*, $3^{rd}$ ed., Springer–Verlag, 1996.

Mitchell, Melanie "An Introduction to Genetic Algorithms," The MIT Press, 1996.

Montana, David, "Introduction to the Special Issue: Evolutionary Algorithms for Scheduling," *Evolutionary Computation*, vol. 6, No. 1, Spring 1998, pp. v–ix.

Sebaaly, M.F. and Fujimoto, H., *"A Genetic Planner for Assembly Automation,"* Proceedings of IEEE International Conference on Evolutionary Computation, V20–22, May 1996, pp. 401–4066.

Srivans, M. et al., *"Adaptive Probabilities of Crossover and Mutation in Genetic Algoritms,"* IEEE Transactions on Systems, Man and Cybernetic, IEEE Inc. New York, vol. 24, No. 4, Apr, 1, 1994, pp. 656–667.

Syswerda, G. et al., *"The Application of Genetic Algorithms to Resource Scheduling,"* Proceedings of the International Conference on Genetic Algorithm, US, San Mateo, Morgan, Kaufman, vol. Conf. 4, 19991, pp. 502–508.

* cited by examiner

VEHICLE ASSEMBLY SEQUENCE DIAGRAM

METHOD FOR GENERATING NEAR-OPTIMAL SEQUENCING OF MANUFACTURING TASKS SUBJECT TO USER-GIVEN HARD AND SOFT CONSTRAINTS

This application claims the benefit of Provisional Application No. 60/112,329 filed, Dec. 15, 1998.

FIELD OF THE INVENTION

The field of the invention is evolutionary processes; more particularly, the present invention relates to a method utilizing evolutionary processes for solving partial constraint satisfaction problems in order to produce a near-optimal or optimal sequence of products for manufacture.

SUMMARY OF THE INVENTION

The present invention relates to a method for solving partial constraint satisfaction problems, more particularly to a method of sequencing products for manufacture such that the sequence produced is a near-optimal or optimal sequence, meaning that direct cost associated with various labor, processes, and parts inventory are minimized and equipment and floor space utilization are maximized. One application of the method of the present invention is the sequencing of automobiles during manufacturing, in which vehicles are sequenced to go through a series of operations such as body forming, painting, component assembly (such as installing radios, seats, etc.) and final assembly (adding trim and chassis).

BACKGROUND OF THE INVENTION

The sequencing of manufacturing stages or tasks represents a combinatorial, or partial, constraint satisfaction and optimization problem.

As is understood by those skilled in the art, partial constraint satisfaction problems (PCSP's), such as scheduling or sequencing, do not lend themselves easily to automated solving. A solution to a PCSP typically must satisfy a set of hard constraints to be valid or feasible, and must minimize the costs associated with violating one or more conflicting soft constraints (i.e., the solution must present the best trade-off among the conflicting soft constraints). The soft constraints cannot be all completely or simultaneously satisfied in a solution. Thus, each soft constraint is allowed to be violated at a cost (i.e., partially satisfied) and the best solution is a valid solution (i.e., satisfying all hard constraints) which minimizes the costs incurred with violating the soft constraints and the degree of violation thereof.

PCSP's, such as the scheduling (or sequencing) of products for manufacture present a particularly difficult type of problem—a computationally complex problem, referred to as an NP-complete problem (see Garey, M. and Johnson, D. , *Computers and intractability: a guide to the theory of NP-completeness*, Freeman, 1979.), for which search techniques that deterministically and exhaustively search the space of possibilities fail to generate a viable solution in a realistic time period. For the generic problem of assigning N tasks to M resources with a particular ordering of tasks at each resource, the number of possible solutions is $$\binom{N+M-1}{M-1} N!$$

which implies super-exponential growth as a function of the number of tasks and resources. In addition to sheer size, this search space has a more complex topology than a Euclidean space or, when M >1, a space of permutations.

Exhaustive search (for the best sequence) is impractical for most of the real-world sequencing problems which often have a sequence length ranging from the 100's to the 1000's and are subject to many conflicting constraints. Traditional algorithmic techniques, such as dynamic programming (see Bellman, R. E., and Dreyfus, S. E., *Applied dynamic programming*, Princeton University Press, 1962), and branch-and-bounds (see Lawler, E. L., and Wood, D. E., "Branch and bounds methods: A survey," *Operations Research*, 14, 699–719, 1966) fail due to their lack of scalability. The heuristic methods developed to date are complicated by the details of a particular task, and the algorithmic consideration of the specific constraints is embodied in what amounts to a domain specific expert system. Such heuristic techniques are often highly specific to particular application domains and thus are not useful as general techniques for solving PCSP problems.

Real-world scheduling/sequencing problems present special difficulties not found in the less than real-world problems addressed in the art to date. These difficulties include: (1) the size and complexity of the real-world search space, which is far more formidable than the search typically defined in less than real-world problems; (2) the dynamic process inherent in real-world scheduling/sequencing problems (schedules remain valid only for a limited amount of time; after a certain duration, the world generally has changed enough that the scheduling algorithm has to find a different schedule; additionally, there are time constraints on how long it can take to schedule and reschedule that place limits on the amount of computation that can be performed by a scheduling algorithm; and (3) the different domains and applications present in real-world scheduling problems, which require solutions of different variations of the scheduling problem (these variations arise from a number of different sources, including: differences in the types of hard constraints, such as relative and absolute temporal restrictions, and resource capabilities constraints; the need for additional information beyond an ordered assignment of tasks to resources, such as absolute times, routes traveled, and manufacturing plans; and different sets of evaluation criteria, such as cumulative response time, throughput, time span, and cumulative employee satisfaction.) Real-world scheduling/sequencing algorithms thus must be flexible enough to accommodate different conditions and able to adapt to changes.

Evolutionary computation (abbreviated as "EC"), a general, stochastic framework inspired by the intrinsically robust search and optimization paradigms of biological evolution, presents the most promising direction in solving real-world PCSP's. EC algorithms have been applied to many hard optimization problems where classical methods (e.g., gradient search, linear programming, etc.) have failed to provide good solutions. See, e.g.. Back, T., Fogel, D. B., and Michalewicz, Z, eds., *Handbook of Evolutionary Computation*. New York: Oxford Univ. Press and Institute of Physics, 1997.

All EC algorithms share the same basic high-level philosophy and structure. In any EC algorithm, a "population" of individuals, called "chromosomes," is maintained. Each chromosome represents a potential solution to the problem to be solved. An "initialization process" is incorporated to create the initial population (i.e., the first generation of chromosomes). A "fitness measure" representing certain optimization criteria is employed to evaluate how fit or optimized each chromosome is, and a "selection process" is used to select chromosomes for "reproduction" based on their fitness values. The reproduction process applies "genetic operators" to the selected chromosomes to create probabilistically perturbed variants, called "offspring," among which are likely fitter chromosomes. A unary genetic operator alters a (parent) chromosome in some fashion probabilistically, and is called a "mutation." A binary genetic operator combines probabilistically determined portions of two parent chromosomes to produce two offspring, and is called a "crossover." The offspring chromosomes are then evaluated by the fitness measure and, based on their values of fitness, are used to replace certain worse chromosomes in the population to form a new generation.

The general EC procedure can be outlined as follows, where t denotes generation index and P(t) denotes the population of chromosomes at t:

Begin
  t=0;
  Initialization (to create P(t) typically randomly);
  Repeat
    Fitness evaluation of P(t);
    Selection of chromosomes in P(t);
    Reproduction to produce a P(t+1);
    t=t+1;
  Until certain termination condition is satisfied (when t=T)
End.

By repeating the above evaluation-selection-reproduction loop, the population can be "evolved" to fitter populations (Darwinian survival of the fittest). Note that in the process, P(t) remains of the same size, i.e., has the same number of chromosomes. After a certain number of generations (which is either predetermined, or decided based on specified "termination" conditions), the best chromosome in the final population represents the optimal or near-optimal solution to the problem.

Such a EC paradigm is inherently parallel (as a whole population can evolve simultaneously) and robust (as it is a probabilistic or randomized process). It combines exploitation of the most promising search area, through fitness-governed selection and reproduction, and exploration of the broadest search space through randomness.

Such a EC paradigm is also general in the sense that only the fitness function used to evaluate how "good" a chromosome is requires problem-specific knowledge or information; the other components can be relatively problem-independent. For example, initialization is typically done by randomly generating chromosomes. A typical method of chromosome selection is "roulette wheel" sampling in which each chromosome is assigned a slice of a circular "roulette wheel," with the size of the slice being proportional to the chromosome's fitness. The wheel can then be spun N times, where N is the number of individuals in the population. On each spin, the individual under the wheel's marker is selected to be in the pool of parents for the next generation.

On the other hand, one can also design each component of the EC paradigm (as outlined above) differently to suit special needs of a particular problem. Thus, the EC paradigm is both general and flexible.

Indeed, different EC algorithms are characterized by different designs of the basic components: (1) representation of chromosomes, (2) selection strategy, (3) reproduction strategy (including genetic operators), and (4) problem-dependent criteria and method for fitness evaluation of chromosomes. For example, three pioneer classes of EC algorithms, Genetic Algorithms (GAs) (see Holland, J., *Adaptation in Natural and Artificial Systems*, University of Michigan Press, Ann Arbor, 1975), Evolutionary Programming (EP) (see Fogel, L., et al., *Artificial Intelligence through Simulated Evolution*, Wiley, New York, 1966), and Evolutionary Strategies (ESs), differ in these components. In GAs, which are perhaps the most influential form of EC algorithms, a chromosome has the structure of a bit string, and crossover is emphasized as a major operation, whereas in EP and ES, a chromosome represents a string of real numbers, and mutation is emphasized.

In early applications of EC, a concrete problem description was typically mapped into a standard, well-known chromosome representation, such as a bit string in a classical GA, and the problem was then solved by a standard, well-known EC algorithm, such as a classical GA. This, however, has many limitations. Although bit string (or binary) representation has facilitated the development of the theoretical foundation of GAs, bit string representation severely limits the range in which the algorithm can operate. It is thus ineffective in problems where the desired solution is hierarchical, or where the size and shape of the solution is unknown in advance. In a classical GA, there is one mutation operator and one crossover operator. The mutation operator flips a randomly selected bit in a chromosome to produce a new offspring. The crossover operator cuts the two chromosomes into two parts at the same (randomly selected) position and swaps the second parts of the two chromosomes to produce two offspring chromosomes. These operations, at the level of bits, usually make evolution too slow in converging to a satisfactory solution.

More recent approaches emphasize the use of "natural" chromosome structures which best describe the class of problems to be solved, and accordingly, the use of problem-sensitive genetic operators (see Michalewicz, Z. *Genetic algorithms+data structures=evolution programs*, $3^{rd}$ ed., Springer-Verlag, 1996). An important question (and problem) inherent in these approaches, however, is to what extent should the problem-specific knowledge or information be embedded in the algorithm to achieve a good balance of efficiency and general applicability. Trying to answer this question well is a continuing struggle for EC practitioners.

Among the problems attacked by EC methods, scheduling problems have drawn considerable attention, see Special Issue: Evolutionary Algorithms for Scheduling, *Evolutionary Computation*, 6(1), 1998, including the specific problem of car sequencing, see Warwick, T. and Tsang, E. P. K., "Tackling car sequencing problems using a generic genetic algorithm," *Evolutionary computation*, 3(3): 267–298, 1995. However, the car sequencing problems considered to date constitute unrealistically simplified versions of the real-world problem, having no more than one hard constraint and one type of soft constraints. The approaches considered to date are also not suitable for real-world sequencing problems, which have many different kinds of hard and soft constraints, because with multiple constraints, they do not result in a feasible or valid solution within a finite time period. The prior art crossover operator also can result in severe violation of hard constraints in the offspring produced, and repairing the infeasible offspring can be very expensive.

In sum, there is no effective method, EC-based or not, in the prior art which is able to handle the complex real-world sequencing problems successfully. The present invention overcomes the problems and insufficiencies in the art in a novel manner.

BRIEF SUMMARY OF THE INVENTION

In view of the shortcomings and inabilities of the existing methods for solving real-world sequencing problems, the present invention provides a general method of sequencing manufacturing tasks which employs an EC algorithm to determine near-optimal solutions to a partial constraint satisfaction problem ("PCSP"). A preferred embodiment comprises a method for determining within a finite time period near-optimal sequencing of manufacturing tasks subject to user-given hard and soft constraints.

It is to be understood that the foregoing general description and the following detailed description are exemplary and explanatory only, and not restrictive of the invention as claimed.

DESCRIPTION OF THE DRAWINGS

The present invention will be understood more fully from the detailed description given below and from the accompanying drawings which, however, should not be taken to limit the invention to the specific embodiment but are for explanation and understanding only.

DETAILED DESCRIPTION OF THE INVENTION

The present invention teaches a method of solving partial constraint satisfaction problems, in particular a method of sequencing products for manufacture such that the sequence produced is a near-optimal or optimal sequence, meaning that direct cost associated with various labor, processes and parts inventory are minimized and equipment and floor space utilization are maximized. An example of sequencing products for manufacture is the manufacture of automobiles, in which vehicles are sequenced to go through a series of operations such as body forming, painting, component assembly (such as installing radios, seats, etc.) and final assembly (adding trim and chassis).

In the present invention, in order to be valid or feasible, a solution sequence must satisfy any hard constraints imposed. In addition, there are a number of desirable, but conflicting, constraints (referred to as "soft constraints") which cannot all be completely satisfied in a sequence at the same time. Thus, soft constraints are allowed to be violated at a cost, or partially satisfied. The optimal solution sequence will be a valid sequence (i.e., satisfying all hard constraints) which also minimizes the degree and costs of violating all soft constraints (i.e., providing the best trade-off among the conflicting soft constraints).

The present invention applies to sequencing problems which include some or all of the constraints described below. Constraints other than those described below may also be included.

The method of the present invention comprises: A computer implemented method for generating an optimized or nearly-optimized sequence of "N" number of products for manufacture, where said products are of "M" number of distinct types with a fixed number ("$N_t$") of each type being desired and each product type comprises a unique array ("Q") of distinct features, wherein said manufacture is optionally constrained by one or more of the following constraints: the production requirement for each product type, feature-based position equations, and feature-based position inequalities, wherein each of said constraints is individually designated as either a hard constraint which cannot be violated, or as a soft constraint which can be violated at a predetermined cost; said method comprising:

generating an initial population of chromosomes, wherein each chromosome represents a feasible sequence of products of various types for manufacture, feasibility depending on satisfaction of all of said hard constraints;

associating a fitness value with each chromosome, said fitness value being a function of the predetermined cost associated with the degree of violation of each of said soft constraints;

sorting said chromosomes based on the fitness value associated with each chromosome; and applying iteratively to the population of chromosomes a reproductive process, comprising (1) selection of a genetic operator, (2) selection of one or two chromosomes, the number of chromosomes to be selected correlating with the selected genetic operator, (3) application of the selected genetic operator to the selected one or two chromosomes to cause generation of one or two offspring, (4) insertion of one offspring chromosome into the sorted population, and (5) discard of one of the least desirable chromosomes in the population;

said iterative process being continuously run until the fitness value for the best chromosome satisfies one or more known criteria or until a pre-determined time has elapsed.

The problem description—described above as "N number of products for manufacture, where said products are of "M" number of distinct types with a fixed number ("$N_t$") of each type being desired and each product type comprises a unique array ("Q") of distinct features" can be formulated as follows:

Let S={$S_1, S_2, \ldots, S_N$} be a sequence of N products of M types, where each type t is described by a tuple of Q features ($f_1, f_2, \ldots, f_Q$), such that $f_i$ (i=1, 2, ..., Q) $\in D_i$, where $D_i$ is the domain of feature values for feature i. S is subject to hard constraints, which may or may not include some or all of the following types of hard constraints:

A. Production requirements: for each product type t (=1, ..., M), N(t) products have to be in the sequence S (i.e., have to be produced). Thus N=$\Sigma$N(t). (Alternatively, the product requirement can be included as a soft constraint.)

B. Feature-based position equations: a set of equations which determine product positions based on values of a subset or the whole set of type features. This kind of constraints take into account the limitations present in the means of moving the sequence in the work space (e.g., the availability and locations of holders to carry products to various processes and the ways processes can be applied to the products).

C. Feature-based position inequalities: a set of inequalities which determine the ranges of product positions based on values of a subset or the whole set of type features. This kind of constraint takes into account the time/timing requirements to operate on certain products or their features (e.g., the time frame when workers of certain specific expertise will be available or certain resources/equipment can be available).

In addition, S may (or may not) also be subject to some or all of the following types of soft constraints (i.e., conflicting constraints which cannot be satisfied simultaneously and completely):

A. Feature-based distance equations: a set of equations which determine product distances in the sequence based on values of a subset or the whole set of type features. This kind of constraint often characterizes the need to either group together or spread products with certain features in a sequence for efficient processing (e.g., products requiring the same part are not put too close in a sequence so that there will be sufficient time for the worker or process to install the part without causing a stop of the sequence at the installation point).

B. Feature-based distance inequalities: a set of inequalities which determine the ranges of product distances in the sequence based on values of a subset or the whole set of type features. This kind of constraint usually takes into account the fact that sometimes products do not have to go through a certain process strictly sequentially, rather the process may be applied to products out-of-order so long as the substituted product possess the same or similar features of the replaced product.

For a given feasible and valid sequence, a cost is computed to measure the violation of each soft constraint or each type of soft constraints in the sequence, and the total cost C of the entire sequence is a combination of such individual costs. C can be formulated as a weighted sum of individual costs, where each weight determines the contribution of the corresponding cost to the total cost C. The method of the present invention then finds the optimal or nearly optimal sequence, that being the best sequence which satisfies all hard constraints and minimizes the total cost C for violation of soft constraints.

Figure 1:
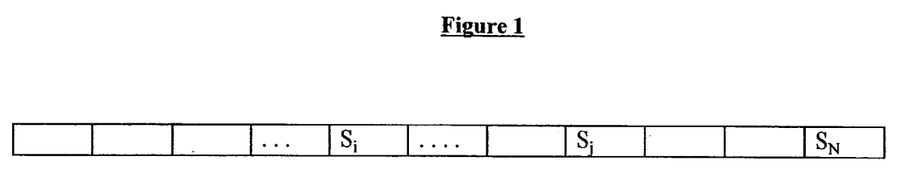
FIG. 1 depicts a chromosome (S) representation of a product sequence: S={$S_1, S_2, \ldots, S_N$} be a sequence of N products of M types. Assume that an assembly schedule must be generated for a set of N vehicles.

The present invention utilizes an EC algorithm characterized by the following components:

Chromosome representation: A population of individual chromosomes, each chromosome being an ordered list representing a feasible and valid product sequence (see FIG. 1), wherein each element in the list corresponds to a product in the sequence. The length of a chromosome is N, the total number of products in a sequence.

Fitness evaluation: The fitness of a chromosome (i.e., a sequence) is measured by the total cost C (as discussed above) for violating soft constraints. Thus, the fitter a chromosome, the lower its total cost.

Initialization: The initial population of chromosomes must include some randomly generated valid sequences (i.e., only sequences which satisfy all hard constraints). The population can consist of only randomly generated valid sequences, or it can also include some pre-determined sequences based on problem-specific heuristic knowledge ("imported" sequences).

Figure 2:
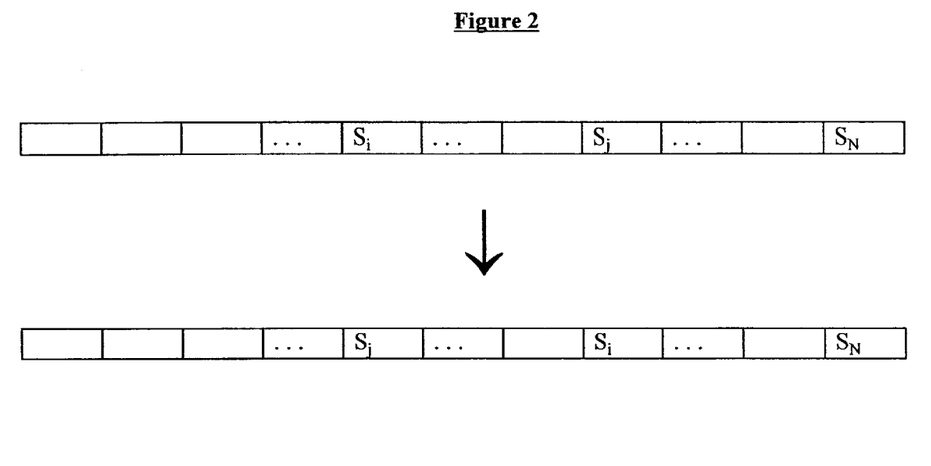
FIG. 2 illustrates a mutation operation.

Genetic operators: Genetic operators are used to alter chromosomes in order to create new and potentially fitter chromosomes. Two operators are preferred: one mutation operator and one crossover operator. The mutation operator performs the following operation on a single chromosome (i.e., a single sequence): first, randomly select two positions where the products are not of the same type; if swapping the two products does not violate any hard constraint, the products are swapped; otherwise, either two new positions are selected and the process repeated, or alternatively the process is aborted (see FIG. 2). Note that operation of the mutation operator does not cause any violation of the hard constraint of production requirements.

Figure 3:
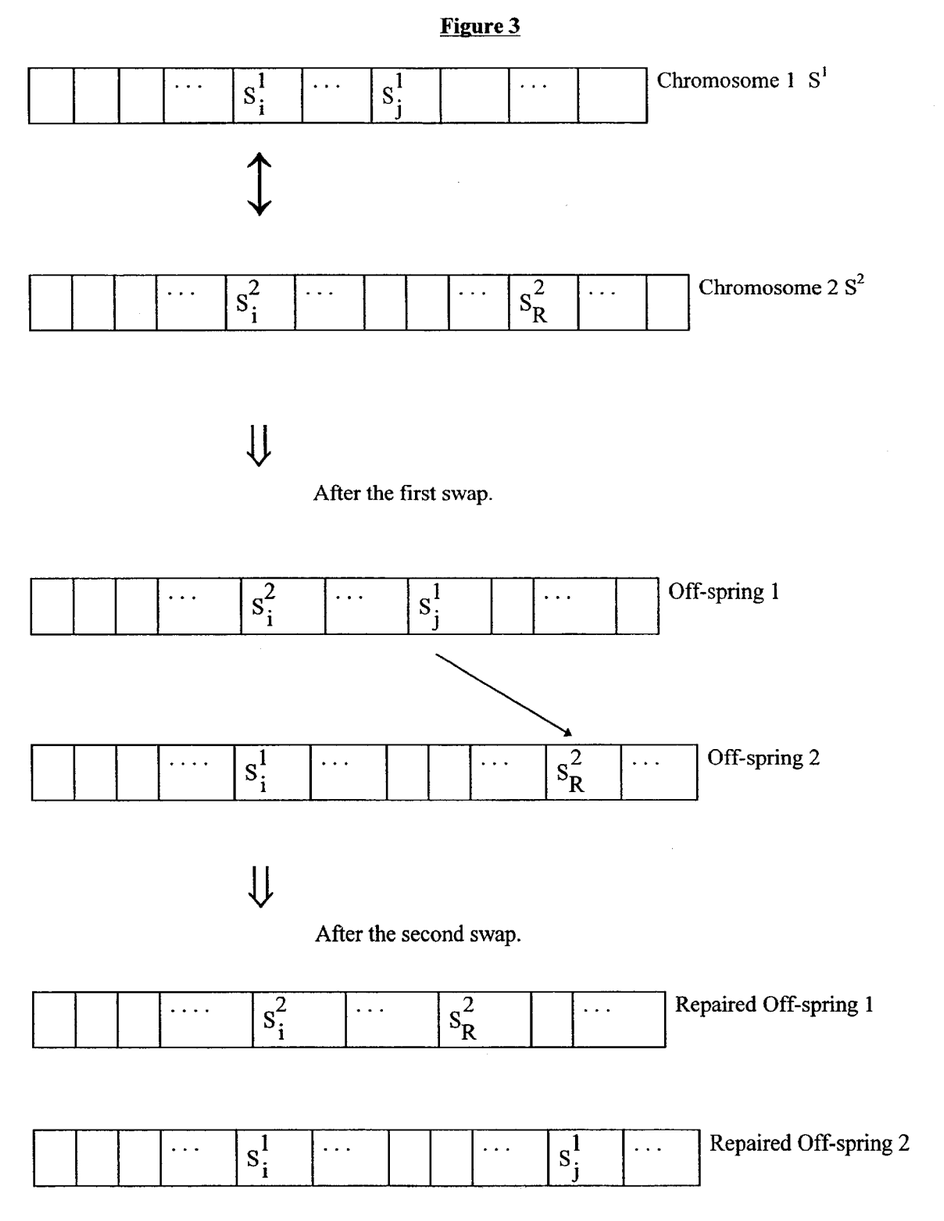
FIG. 3 illustrates a crossover operation.

The crossover operator operates on two chromosomes to generate two new chromosomes (called offspring). It starts by randomly selecting a sequence position and checks if the corresponding products in the two sequences are of the same type. If they are not, the corresponding products are swapped to produce two offspring. Note that as the swapping occurs at the same position, the feature-based position and position range constraints are not violated. Since the swapping inevitably violates the hard constraint of production requirements in the two offspring by decreasing the number of one type of product by 1 and by increasing the number of the other type of product by 1 at the same time, another swapping is needed to repair the offspring. This second swapping (referred to as a "Repair Operation") is likely to happen between products at different positions, as shown in FIG. 3, but again, it will not violate the feature-based position or position range constraints as in the first swapping.

Reproduction: Reproduction refers to the process of generating new chromosomes. In the present invention, this process consists of first selecting a genetic operator, and then selecting either one (if the mutation operator is selected) or two chromosomes (if the crossover operator is selected) for reproduction. Each operator has a probability, and a roulette wheel is constructed based on the operator probabilities. The probability value of an operator can either be pre-determined based on problem-specific knowledge, or can be adjusted during the evolution process based on the operator's usefulness (i.e., performance) in past generations. An operator is selected by "spinning" the wheel.

To facilitate the selection of chromosomes, the initial population of chromosomes are sorted in the ascending order of their fitness (i.e., cost) values. A roulette wheel is built with the size of the slice for each chromosome proportional to its rank in the sorted list. Then each time a selection is done by "spinning" the wheel a chromosome is selected with a probability proportional to its rank. After the genetic operation, the newly generated offspring (or one of the two offspring generated from crossover with repair) is evaluated (i.e., its fitness value is calculated) and is inserted into the sorted population based on its fitness value; one of the worst chromosome in the population is then discarded to maintain the original population size. Such a population now represents a new generation and remains sorted.

Figure 4:
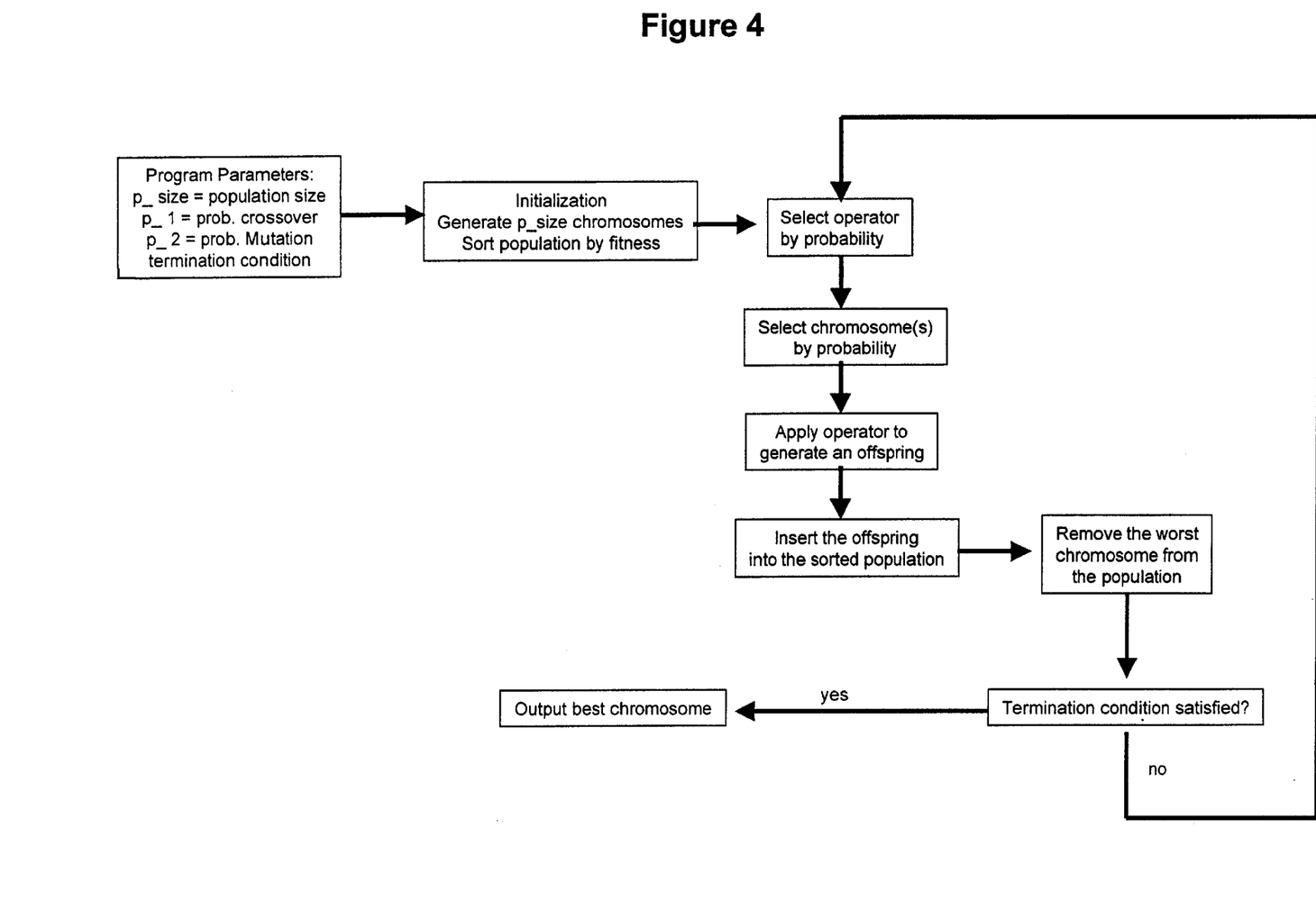
FIG. 4 illustrates the preferred method of the invention.
Figure 5:
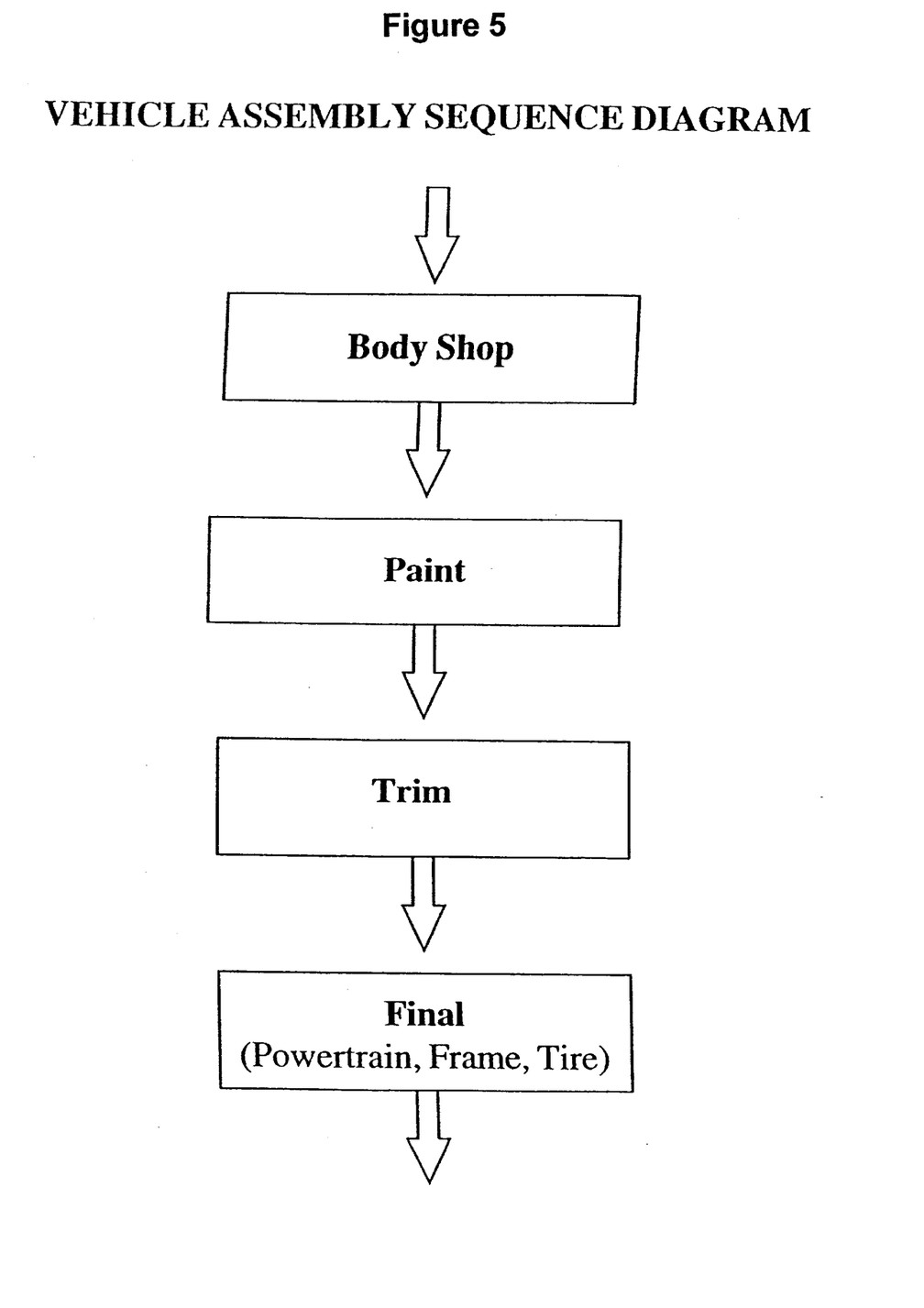
FIG. 5 illustrates the basic operations of an automobile manufacturing sequence.

Overall algorithm: The algorithm starts with an initialization process in which the population is generated. The population is then evaluated as sorted as described above. The reproduction process described above is then repeated until either a set of termination conditions are satisfied, or a pre-determined amount of time has elapsed. The algorithm flow chart is as shown in FIG. 4.

Detailed Description of an Illustrative Embodiment

The nature and variants of the present invention are illustrated by the following example. Although the example is limited to one industry specific embodiment of the invention, the invention itself should not be construed as being so limited. Additionally, (and it should be apparent) various variations and modifications may be made to the invention, with the attainment of some or all of the advantages of the invention. It is the subject of the appended claims to cover these and such other variations and modifications as come within the true spirit and scope of the invention.

The Vehicle Sequencing Problem

The vehicle sequencing problem represents a special instance of the general sequencing problem described above. The primary objective of vehicle sequencing is to develop a vehicle assembly sequence which is preserved throughout the body shop, paint, and final assembly processes, is unlikely to be disrupted, and which simultaneous minimizes the direct costs associated with labor, parts, inventories, and paint costs, while increasing equipment and floor space utilization.

Recently, car sequencing has taken on greater significance as the complexity of vehicle assembly has increased due to automotive manufacturers' desire to accommodate consumers' individual preferences vis-a-vis car exterior colors and features, such as sun roofs, car interior colors, fabrics and options.

The Nature of Vehicle Sequencing

Currently, automobile manufacturing companies offer customers a wide variety of vehicle configurations within each model. The possible combinations of body styles, powertrains, interior and exterior colors, and free-standing options can number in the tens to hundreds of thousands of unique vehicles. This presents a very complex scheduling problem when determining the ideal sequence of vehicles to be built on a given day. However, it is an important problem to solve, since an optimum sequence will reduce direct labor, parts inventories and paint costs, while increasing equipment and floor space utilization.

In the past, off-line repairs of defects in the upstream body shop created an unpredictable sequence of vehicles for the paint shop, while off-line paint defect repairs resulted in an even less predictable bank of vehicles for the final assembly (trim and chassis) line sequence. Poor sequences entering the paint bank cause a significant waste of materials. For instance, each time the color of a vehicle changes from its predecessor in the enamel paint booth, the previous paint color must be purged from the paint system gun, wasting paint and cleaning solvent. Poor sequences can also result in the occurrence of unnecessary costs in the final assembly line. The cost of poor sequences with respect to high labor value options is direct labor. For example, consider an assembly line which produces sixty vehicles per hour and contains a moonroof installation station. For a randomly arranged sequence of vehicles, if each installation requires 1.5 minutes of direct labor by two workers, a second worker is needed in the moonroof station to stay within the 1 minute of cycle time. In a "good" assembly sequence, at least one non-moonroof vehicle will be spaced between any two moonroof vehicles, such that one worker will be able to keep up with the workload and return to the beginning of his station after each installation. Good sequences also require less floor space per individual station because workers are not forced as far out of their station by the needs of consecutive high labor value jobs. The sequencing efficiencies are lost when the optimal manufacturing sequence is disrupted by missing vehicles at the point where units are also moved from the paint bank to the start of the final assembly line. Finally, an unpredictable sequence requires the inventory of parts to account for all possible vehicle configurations.

These types of inefficiencies can be avoided using the method of the present invention. For instance, with the optimized sequencing solution of the present invention in place, suppliers can ship the exact parts at the exact time needed and significantly reduce inventory holding costs. Additionally, since units stored in the paint bank have no powertrain, trim or options, and are distinguishable only by their body-in-white (BIW) characteristics and paint color, the present invention reduces inefficiencies by providing for substitution between any missing unit and another unit in the paint bank with the same BIW and color but a later sequence number. The missing unit then gains additional time to arrive in the paint bank before it causes a break in the vehicle sequence.

The combination of BIW (e.g., sedan/wagon, two or four door, moonroof, and seating configuration) and paint color (e.g., body color and any two-tone accent color or paint stripe) is called a painted body. Depending on the vehicle line there can be up to a thousand unique painted bodies. To facilitate substitution, the method of the present invention provides for a "back-up" for each vehicle consisting of an identical painted body in the paint bank at the time that it must be moved to the final assembly line. To do so, requires spacing identical painted bodies at a fixed interval which relates to the paint bank size. [Substitution has cost benefits resulting from smaller paint banks and less inventory in the paint banks, as well as optimized in-line vehicle sequencing.] Painted body spacing, however, adds a great deal of complexity to the sequencing problem, since the effect is to add one constraint for each unique painted body. For a typical plant, this will increase the number of constraints from less than 20 to over 100. The present invention, however, provides a feasible method for sequencing of this high level of complexity.

Representation

The product here is a vehicle, and the type of the vehicle is determined by the following features: body type, paint type/color, and features characterizing option types (such as radio, car phone, seat cover, etc.). A customized vehicle type is then described by a tuple of such features, and each set of feature values describes a unique vehicle type. Thus, the problem may be represented as follows:

Given N cars of M types, which require a total of K options, as specified by $$O(j, k) = \begin{cases} g & \text{if car type } j \text{ requires option } k \text{ of grade } g \\ 0 & \text{otherwise} \end{cases}$$

where $j=1, \ldots, M$ and $k=1, \ldots, K$, find a schedule S as a sequence of the N cars, satisfying the hard constraints: (1) production requirements; (2) fixture constraints; and (3) rotation range constraints; while optimizing the following: (1) optional spacing; (2) painted-body spacing; and (3) paint blocking.

Each vehicle type $j, j=1, \ldots, M$, is determined by a tuple of attributes $(b_j, p_j, pb_j, O_j)$, where $b_j$ is the index of the car body type, $p_j$ is the index of the paint type, $pb_j$ is the index of the painted-body type, and $O_j$ is a set of option-grade pairs as defined by the function $O(j,k)$.

Production requirements, fixture constraints, and rotation range constraints are three types of hard constraints often considered in a real-world vehicle sequencing problem. The first, production requirements, is as described in the general problem formulation earlier, and can be formulated in the problem as $Pr_j$ cars for car type j, where $j=1, \ldots, M$. Note that $$N = \sum_{j=1}^{M} Pr_j.$$

The second constraint, which is referred to as the fixture constraint, is a special case of the general feature-based position equations constraint. The fixture constraint requires that a vehicle of certain body type (e.g., sedan or wagon, or different car model) can only be placed at some specific positions in the sequence. The fixture constraint can be formulated in the problem as a fixed body type sequence $x_1 x_2 \ldots x_N$, where $x_i \in \{1, \ldots, B\}$ for $i=1, \ldots, N$, is required, where B is the total number of body types.

The third constraint, referred to as the rotation range constraint is a special case of the general feature-based position inequalities constraint. The rotation range constraint requires that vehicles with certain feature values must be produced within a certain time frame, which can be translated as that they must be placed within a certain range of positions in the sequence. The rotation range constraint can be formulated in the problem as:: $i_{j1} < r(i) < i_{j2}$ where $r(j)$ is the position of the car type j, and $1 < i_{j1} < i_{j2} < N$.

The hard constraints are consistent with one another and can all be satisfied at the same time.

The three types of soft constraints, optional spacing, painted-body spacing, and paint blocking, are generally included in real-world vehicle sequencing problems. The option spacing constraint is a special case of the general feature-based distance inequalities constraint. It specifies, in this instance, that any two vehicles sharing certain feature values should be separated by a minimum distance, i.e., the smallest distance d between such two vehicles is greater than a $d_{min}$ (i.e., $d > d_{min}$). For example, if two vehicles require the same type of radio and no other vehicle between them in the sequence requires that type of radio, the distance between them should allow sufficient time for installation of the radio on one vehicle before the second vehicle arrives for installation of the same radio.

Optional spacing can be formulated in the problem in the following manner: if there are $N_k$ vehicles requiring option k in the sequence of N vehicles, the ideal spacing for option k is $N/N_k$. Less spacing incurs a cost. Cost for option k, thus, would be:

$$C_{os}(k) = \sum_{i=1}^{\#violations} \left( \frac{ideal_k - actual_i + 1}{ideal_k} \right)^3$$

and total cost for optional spacing is a weighted sum of costs for individual options:

$$C_o = \sum_{k=1}^{K} a_k C_{os}(k)$$

where $a_k$ is the priority/weight for option k and K is the total number of options.

The painted-body spacing constraint is also a special case of the general feature-based distance inequalities constraint. It specifies both a minimum and a maximum distance between two vehicles of the same painted-body type, i.e., the combination of a basic body type (without powertrain, trim, or options) and the paint color. For each painted-body type, such a constraint is in the form of $d_{min} < d < d_{max}$, where d is the smallest distance between two vehicles of that painted body. The painted-body spacing constraint ensures that there is always at least one substitute in the paint bank for any painted body accidentally missing from the sequence at the scheduled time of its painting. This substitution allows for efficiency to be gained by preventing the break of sequence due to the missing unit and also allows for additional time for the missing unit to arrive at the paint bank. The determination of the distance bounds ($d_{min}$ and $d_{max}$) depends on the size of the paint bank.

Painted-body spacing can be formulated in the problem as: $n \in [L,U]$ vehicles of identical painted bodies should be in the paint bank of size A at any time. Violation incurs a cost. $N_p$ (i,j) is the number of vehicles of painted-body j in the A vehicles starting from position i.

The cost associated with j at i is, thus:

$$C_{pl}(i, j) = \begin{cases} L - N_p(i, j) & \text{if } N_p(i, j) < L \\ N_p(i, j) - U & \text{if } N_p(i, j) > U \\ 0 & \text{else} \end{cases}$$

and total cost for painted-body spacing:

$$C_p = \sum_{i=1}^{N} h_j C_{pl}(i, j)$$

where $h_j$ is the weight for painted-body type j and contains painted-body type information for position i.

The paint-blocking constraint is a special case of the general feature-based distance equation constraint. It specifies that vehicles of the same exterior paint color be grouped together, i.e., d=1, where d is the smallest distance between two identical painted bodies. This constraint minimizes the financial cost associated with paint gun purge every time paint colors are switched. This constraint can be formulated in the problem as: V vehicles of the same paint type are preferred to form a consecutive subsequence (block). Violation incurs a cost. If $N_m$ is the length of the m-th same-paint subsequence in the vehicle sequence, then the associated cost is:

$$C_b(m) = \begin{cases} 1 & \text{if } N_m \% V > 0 \\ 0 & \text{if } N_m \% V = 0 \end{cases}$$

where $N_m \% V$ returns the remainder when $N_m$ is divided by V, and the total cost for paint blocking is a weighted sum of costs associated with individual same-paint subsequences:

$$Cpb = \sum_{m=1}^{D} w_m C_b(m)$$

where D is the total number of paint changes.

Clearly the soft constraints described above conflict with one another, and it is difficult or even impossible to satisfy any one of them completely. Accordingly, violation of a soft constraint is allowed at a pre-determined cost.

Given a vehicle sequence, as in the general formulation of the sequencing problem described earlier, the total cost associated with the soft constraints is a weighted sum of individual costs, where each weight determines the contribution of the corresponding individual cost of the total cost. The fitness of each chromosome is thus a function of the cost function measuring the degree of violation of soft constraints: Cost=$c_0 C_o + c_1 C_p + C_2 C_{pb}$. The coefficients $c_i$, i=0, 1, 2 can characterize the priorities of the three kinds of costs.

The problem can now be solved with the algorithm of the present invention to find the best sequence of vehicles which satisfies all hard constraints and minimizes the total cost for violation of soft constraints.

The algorithm of the present invention was tested on sample data sets provided to the inventor by a major United States automobile manufacturing company. The results of the test runs are presented in the Examples below.

Example One (Data Set 1)

Data Set 1: 512 vehicles of 100 types, 1 body type, 12 paint types, 28 painted body types, and 9 options.

TABLE 1

System Parameters

| Population Size | Crossover Probability | Mutation Probability |
|---|---|---|
| 5 | 0.6 | 0.4 |

Results for Data Set 1

TABLE 2

Total time

| | generation = 10,000 |
|---|---|
| Cost With Optional Spacing Only | about 2.5 min. |
| All costs | about 18 min. |

TABLE 3

Costs with optional spacing only

| Initial Population | Best Initial Result | Best Final Result (generation = 20,000) |
|---|---|---|
| Randomly Generated | 333.068 | 23.684 |
| Included Sample* | 25.080** | 8.967 |

*a pre-determined "good" sample sequence is included in the otherwise randomly generated initial population.
**is also the cost of the sample sequence.

TABLE 4

Costs (randomly generated initial population)

| Costs (weights) | Best Initial Result | Best Final Result (generation = 20,000) |
|---|---|---|
| Optional Spacing (1) | 353.52 | 46.45 |
| Painted Body Spacing (0.1) | 8864 | 7755 |
| Paint Block (1) | 450 | 294 |

Example Two (Data Set 2)

The system parameters for this run were as set forth in Table 1 in Example One.

Data Set 2: 852 vehicles of 167 types, 2 body types, 13 paint types, 1 painted body type, and 20 options.

Results for Data Set 2
Total time: about 5 minutes for 10,000 generations.

TABLE 5

Costs (with optional spacing only)

| Initial Population | Best Initial Result | Best Final Result (generation = 20,000) |
|---|---|---|
| Randomly Generated | $5.6 \times 10^{16}$ | $5.67 \times 10^{15}$ |
| Included Sample$^{(*)}$ | $6.45 \times 10^{15(**)}$ | $6.11 \times 10^{15}$ |

$^{(*)}$a pre-determined "good" sample sequence is included in the otherwise randomly generated initial population.
$^{(**)}$is also the cost of the sample sequence.

TABLE 6

Costs (with paint blocking only)

| Initial Population | Best Initial Result | Best Final Result (generation = 10,000) |
|---|---|---|
| Randomly Generated | 741 | 482 |
| Included Sample | 471* | 385 |

*is also the cost of the sample sequence.

The algorithm of the present invention was also implemented and used in one real-world vehicle manufacturing plant with excellent results: the number of units in the paint bank without an identical painted body back-up being reduced by an average of 36%, while the rest of the scheduling objectives were also achieved.

It will be appreciated that many modifications may be made to the system described above without departing from the scope of the present invention. For example, possible modifications include:

A. Modifications to the way the values of the system parameters are assigned, such as the population size, the operator probabilities, the coefficients in the fitness measure, etc. While such values may be determined in an ad hoc way based on experience, the values assigned to system parameters can also be adapted based on their influence to the system and the system performance, which indirectly reflects the characteristics of the specific problem being attacked. Such a self-adapting system allows use of the system without requiring the users to be experts with insights of system and even the problem. One example of a self-adapting version of the present invention is the use of weighted sum of costs related to known goals. Different assignments of these weights would significantly affect the behavior of the optimization system.

B. Use of additional genetic operations. Existing genetic operations can be incorporated into the present invention, for instance, heuristic strategies for initialization (note that the preferred embodiment uses random initialization), and dynamic termination conditions.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed:

1. A computer implemented method for generating an optimized sequence of "N" number of items, where said items are of "M" number of types with a fixed number ("$N_t$") of each type being desired and each item type comprising an array ("Q") of features, wherein said sequence of items is optionally constrained by one or more of the constraints, wherein each of said one or more constraints is individually designated as either a hard constraint which cannot be violated, or as a soft constraint which can be violated at a predetermined cost; said method comprising:

generating an initial population of chromosomes, wherein each chromosome represents a feasible sequence of items, feasibility depending on satisfaction of all of said hard constraints;

associating a fitness value with each chromosome;

sorting said chromosomes based on the fitness value associated with each chromosome; and applying iteratively to the population of chromosomes a reproductive process, said reproductive process comprising application of a selected genetic operator to a selected one or more chromosomes to cause generation of one or two offspring said reproductive process being continuously run until the fitness value for the best chromosome satisfies one or more known criteria, wherein one or more genetic operators available for selection is assigned a probability of selection value and a roulette wheel scheme and a roulette wheel scheme utilizing these probability of selection values is used to choose operators.

2. The method of claim 1, wherein said items comprise products for manufacture.

3. The method of claim 1, wherein said types are distinct types.

4. The method of claim 1, wherein said features are distinct features.

5. The method of claim 1, wherein said constraints comprise one or more constraints selected from the group consisting of: a production requirement for each item type; feature-based position equations; and feature-based position inequalities.

6. The method of claim 1, wherein said fitness value is a function of the predetermined cost associated with the degree of violation of each of said soft constraints.

7. The method of claim 1, wherein said reproductive process further comprises: (1) selection of said genetic operator, (2) selection of one or two chromosomes, the number of chromosomes to be selected correlating with the selected genetic operator, (3) application of the selected genetic operator to the selected one or two chromosomes to cause generation of one or two offspring, (4) insertion of one offspring chromosome into the sorted population, and (5) discard of one of the least desirable chromosomes in the population.

8. A computer implemented method for generating an optimized sequence of "N" number of products for manufacture, where said products are of "M" number of distinct types with a fixed number ("Nt") of each type being desired and each product type comprising an array ("Q") of distinct features, wherein said manufacture is optionally constrained by one or more of the following constraints: the production requirement for each product type, feature-based position equations, and feature-based position inequalities, wherein each of said constraints is individually designated as either a hard constraint which cannot be violated, or as a soft constraint which can be violated at a predetermined cost; said method comprising:

generating an initial population of chromosomes, wherein each chromosome represents a feasible sequence of products of various types for manufacture, feasibility depending on satisfaction of all of said hard constraints;

associating a fitness value with each chromosome;

sorting said chromosomes based on the fitness value associated with each chromosome; and applying iteratively to the population of chromosomes a reproductive process, said iterative process being continuously run until the fitness value for the best chromosome satisfies one or more known criteria or until a pre-determined time has elapsed, wherein said one or two chromosomes are selected using a roulette wheel, wherein said roulette wheel comprises a probability distribution derived from the relative ranking of the fitness values associated with each chromosome such that the probability for an individual chromosome to be selected is proportional to its relative ranking.

9. The method as set forth in claim 8 wherein said genetic operator comprises one of the of the following: a mutation operator and a crossover operator.

10. The method as set forth in claim 9 wherein one chromosome is selected if the genetic operator is a mutation operator.

11. The method as set for in claim 9 wherein two chromosomes are selected if the genetic operator is a crossover operator.

12. The method as set forth in claim 8 wherein said genetic operator is a crossover operator.

13. The method as set forth in claim 12 wherein application of said crossover operator comprises the steps of selecting two parent chromosomes from the population, randomly selecting a position index, said position index representing the location of a single product comparing between the two parent chromosomes the single product located at said position index, and if said two single products located, one in each parent chromosome at said position index, are not identical to one another, generating two offspring chromosomes identical to two parent chromosomes with the exception that the two single products located at the position index are swapped;

locating within each of the two offspring chromosomes the first sequential product that is identical to the swapped-in product; and swapping between the two offspring chromosomes said sequential products.

14. The method as set forth in claim 8 wherein said genetic operator is a mutation operator.

15. The method as set forth in claim 14 wherein application of said mutation operator comprises the steps of randomly selecting two position indices, each position index representing the location of a single product, comparing the single product located at each position index, and if said single products are not identical, interchanging the single products so long as the resulting sequence satisfies all hard constraints.

16. The method as set forth in claim 8 wherein application of the selected genetic operator comprises the steps of randomly selecting two position indices, each position index representing the location of a single product, comparing the single product located at each position index, and if said single products are not identical, interchanging the single products so long as the resulting sequence satisfies all hard constraints.

17. The method as set forth in claim 8 wherein application of the selected genetic operator comprises the steps of selecting two parent chromosomes from the population, randomly selecting a position index, said position index representing the location of a single product comparing between the two parent chromosomes the single product located at said position index, and if said two single products located, one in each parent chromosome at said position index, are not identical to one another, generating two offspring chromosomes identical to two parent chromosomes with the exception that the two single products located at the position index are swapped;

locating within each of the two offspring chromosomes the first sequential product that is identical to the swapped-in product; and swapping between the two offspring chromosomes said sequential products.

18. The method of claim 8 in which each of said one or more genetic operators available for selection is assigned a probability of selection value and a roulette wheel scheme utilizing these probability of selection values is used to choose operators.

19. The method of claim 18 wherein the probability of selection values are assigned in such a way that all operators are equally likely to be selected.

20. The method of claim 18 wherein the probability of selection values are assigned in such a way that the crossover operator is less likely to be selected.

21. The method of claim 18 wherein the probability of selection values are assigned in such a way that the crossover operator is more likely to be selected.

22. The method of claim 18 in which the probability of selection value assigned to each operator varies from iteration to iteration relative to the usefulness of each operator in previous iterations.

23. The method as set forth in claim 8 in which the initial population of chromosomes comprises randomly generated chromosomes.

24. The method as set forth in claim 8 in which the initial population of chromosomes comprises imported chromosomes.

25. A computer implemented method for generating an optimized sequence of "N" number of items, where said items are of "M" number of types with a fixed number ("$N_t$") of each type being desired and each item type comprising an array ("Q") of features, wherein said sequence of items is optionally constrained by one or more of the constraints, wherein each of said one or more constraints is individually designated as either a hard constraint which cannot be violated, or as a soft constraint which can be violated at a predetermined cost; said method comprising:

generating an initial population of chromosomes, wherein each chromosome represents a feasible sequence of items, feasibility depending on satisfaction of all of said hard constraints;

associating a fitness value with each chromosome;

sorting said chromosomes based on the fitness value associated with each chromosome; and applying iteratively to the population of chromosomes a reproductive process, said reproductive process comprising application of a selected genetic operator to a selected one or more chromosomes to cause generation of one or two offspring said reproductive process being continuously run until the fitness value for the best chromosome satisfies one or more known criteria, wherein said genetic operator comprises a mutation operator, comprising the steps of randomly selecting two position indices, each position index representing the location of a single product, comparing the single product located at each position index, and if said single products are not identical, interchanging the single products so long as the resulting sequence satisfies all hard constraints.

26. A computer implemented method for generating an optimized sequence of "N" number of items, where said items are of "M" number of types with a fixed number ("$N_t$") of each type being desired and each item type comprising an array ("Q") of features, wherein said sequence of items is optionally constrained by one or more of the constraints, wherein each of said one or more constraints is individually designated as either a hard constraint which cannot be violated, or as a soft constraint which can be violated at a predetermined cost; said method comprising:

generating an initial population of chromosomes, wherein each chromosome represents a feasible sequence of items, feasibility depending on satisfaction of all of said hard constraints;

associating a fitness value with each chromosome;

sorting said chromosomes based on the fitness value associated with each chromosome; and applying iteratively to the population of chromosomes a reproductive process, said reproductive process comprising application of a selected genetic operator to a selected one or more chromosomes to cause generation of one or two offspring said reproductive process being continuously run until the fitness value for the best chromosome satisfies one or more known criteria, wherein said genetic operator comprises a crossover operator, comprising the steps of:

selecting two parent chromosomes from the population, randomly selecting a position index, said position index representing the location of a single product comparing between the two parent chromosomes the single product located at said position index, and if said two single products located, one in each parent chromosome at said position index, are not identical to one another, generating two offspring chromosomes identical to two parent chromosomes with the exception that the two single products located at the position index are swapped;

locating within each of the two offspring chromosomes the first sequential product that is identical to the swapped-in product; and swapping between the two offspring chromosomes said sequential products.

* * * * *